United States Patent
Koreeda et al.

(10) Patent No.: US 7,286,254 B2
(45) Date of Patent: Oct. 23, 2007

(54) COMMUNICATION CONTROL APPARATUS AND METHOD OF CONVERTING BETWEEN FACSIMILE AND E-MAIL TRANSMISSIONS

(75) Inventors: Kazuyoshi Koreeda, Tokyo (JP); Kazuto Kobayashi, Tokyo (JP); Asahiro Onuma, Tokyo (JP); Yuuji Takemoto, Tokyo (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 1048 days.

(21) Appl. No.: 10/255,686

(22) Filed: Sep. 27, 2002

(65) Prior Publication Data
US 2003/0095290 A1 May 22, 2003

(30) Foreign Application Priority Data
Nov. 21, 2001 (JP) .............................. 2001-355905

(51) Int. Cl.
H04N 1/00 (2006.01)
G06K 15/00 (2006.01)
(52) U.S. Cl. ...................... 358/1.15; 358/407; 358/405
(58) Field of Classification Search ................ 358/402, 358/407, 400, 403, 405, 434, 435, 436, 437, 358/438, 439; 379/100.08
See application file for complete search history.

(56) References Cited

U.S. PATENT DOCUMENTS

| | | | | |
|---|---|---|---|---|
| 6,028,679 | A * | 2/2000 | Murphy ...................... | 358/407 |
| 6,185,604 | B1 * | 2/2001 | Sekiguchi .................... | 709/206 |
| 6,246,487 | B1 * | 6/2001 | Kobayashi et al. ......... | 358/1.13 |
| 6,356,356 | B1 * | 3/2002 | Miller et al. ................ | 358/1.15 |
| 6,411,685 | B1 * | 6/2002 | O'Neal ..................... | 379/88.14 |
| 6,778,287 | B1 * | 8/2004 | Toyoda et al. ............. | 358/1.15 |
| 6,823,367 | B1 | 11/2004 | Wakasugi et al. | |
| 6,898,627 | B1 * | 5/2005 | Sekiguchi .................... | 709/217 |
| 7,072,062 | B2 * | 7/2006 | Eguchi ...................... | 358/1.15 |
| 2002/0054358 | A1 * | 5/2002 | Hochman .................. | 358/400 |

FOREIGN PATENT DOCUMENTS

| | | |
|---|---|---|
| JP | 9-261426 | 10/1997 |
| JP | 10-173847 | 6/1998 |

(Continued)

OTHER PUBLICATIONS

English Language Abstract of JP 2001-265675.

(Continued)

*Primary Examiner*—Jerome Grant, II
(74) *Attorney, Agent, or Firm*—Greenblum & Bernstein, P.L.C.

(57) ABSTRACT

A network communication control apparatus that converts data from a facsimile apparatus into e-mail to transmit to another communication apparatus, and converts e-mail from another communication apparatus into facsimile data to transmit to the facsimile apparatus, the network communication control apparatus further stores managing data that includes whether transmission to/from facsimile apparatus from/to another communication terminal is complete, determines whether the un-transmitted managing data is stored at a predetermined timing, and notifies the sender regarding the un-transmitted data, when the un-transmitted managing data is stored, according to the content of data. This is to allow the sender to be easily and automatically notified when the data transmission is incomplete, and to improve the reliability of the network communication control apparatus.

8 Claims, 5 Drawing Sheets

FOREIGN PATENT DOCUMENTS

| | | |
|---|---|---|
| JP | 3133297 | 8/2000 |
| JP | 2000224333 | 8/2000 |
| JP | 2001-265675 | 9/2001 |
| JP | 2001-292293 | 10/2001 |

OTHER PUBLICATIONS

English Language Abstract of JP 10-173847.
English Language Abstract of JP 2001-292293.
English Language Abstract of JP 9-261426.
English Language Abstract of JP Appln. No. 2000-224333.

* cited by examiner

COMMUNICATION CONTROL APPARATUS AND METHOD OF CONVERTING BETWEEN FACSIMILE AND E-MAIL TRANSMISSIONS

BACKGROUND OF THE INVENTION

1. Field of the Invention

This invention relates to network communication control apparatus and method that perform network facsimile communication via LAN and Internet, using a facsimile apparatus.

2. Description of Related Art

In recent years, Internet facsimile apparatuses that employ the Internet are introduced, with the increasing use of the Internet. For example, Japanese Patent No. 3,133,297 (filed by the same applicant as this invention) proposes a network communication control apparatus that enables an Internet phone and Internet facsimile communications by connecting with analog communication terminals such as general telephones and facsimile apparatuses.

According to the above communication control apparatus, facsimile data transmitted from a general facsimile apparatus is converted into a TIFF file and attached to e-mail, to be further transmitted to other communication terminals such as the opposing Internet facsimile apparatus, computer, and network communication control apparatus similar to the sending apparatus. In addition, it is possible to receive e-mail data from other communication terminals via network, convert the data into facsimile data, and transmit the facsimile data to a connected general facsimile apparatus.

With the above communication control apparatus, when a facsimile apparatus completes a facsimile data transmission to the communication control apparatus, the facsimile apparatus determines that the transmission is complete, allowing the operator to assume that the transmission process is thus complete.

However, there are cases when the communication control apparatus attempts to transmit e-mail but fails to transmit the same, because of a power failure at the communication control apparatus due to problems such as a power outage. The transmission of e-mail data is also impossible when the network cable is disconnected or when the mail server is down.

In addition, even if e-mail data is received from another communication terminal, there are cases when the data cannot be forwarded to a facsimile apparatus because of a power failure at the communication control apparatus due to problems such as a power outage. However, the e-mail is still received. Therefore, the mail server completes the procedure as usual, without sending error mail, allowing the sender to assume that the transmission has been completed.

In order to address the problem, the communication control apparatus may include an uninterruptible power supply or a non-volatile memory for storing data. However, such an attempt complicates the structure, up-sizes the apparatus and significantly raises the cost. Since facsimile transmissions are based on premise that the sender should re-transmit data when a transmission fails, it is not very important to store the transmission data as long as the sender is notified that the transmission is incomplete.

SUMMARY OF THE INVENTION

The present invention addresses the above-described problems in the prior art. The object of the invention is to provide a network communication control apparatus that notifies a sender so as to instruct for a re-transmission upon recovery, when data is lost without completing a transmission, e.g., SMTP session failure, in situations where the power for the network communication control apparatus fails, a network cable is disconnected, or the mail server is down.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The preferable embodiment of the present invention is explained in the following, in reference to the above-described drawings.

Figure 1:
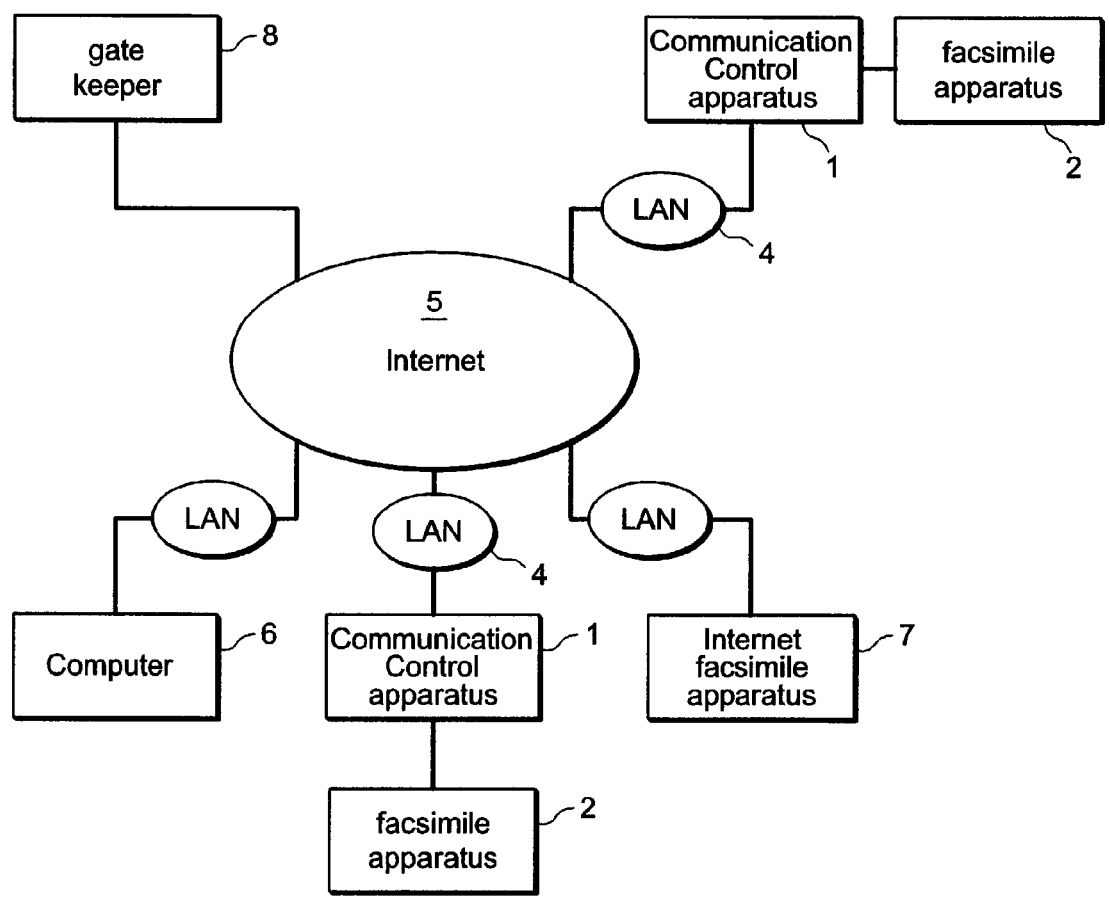
FIG. 1 illustrates a configuration of a state in which an Internet communication control apparatus as a network communication control apparatus according to an embodiment of the present invention is connected to a facsimile apparatus and the Internet via LAN.

FIG. 1 illustrates a configuration of a state in which Internet communication control apparatus 1 as a network communication control apparatus according to the present invention is connected to facsimile apparatus 2 and Internet 5 via LAN 4. Apparatuses such as another Internet communication control apparatus 1, computer 6 having an Internet facsimile function, Internet facsimile apparatus 7 dedicated to Internet facsimile transmissions, and gatekeeper 8, which associates an IP address/e-mail address with a telephone number, are connected to Internet 5 via other LANs.

Figure 2:
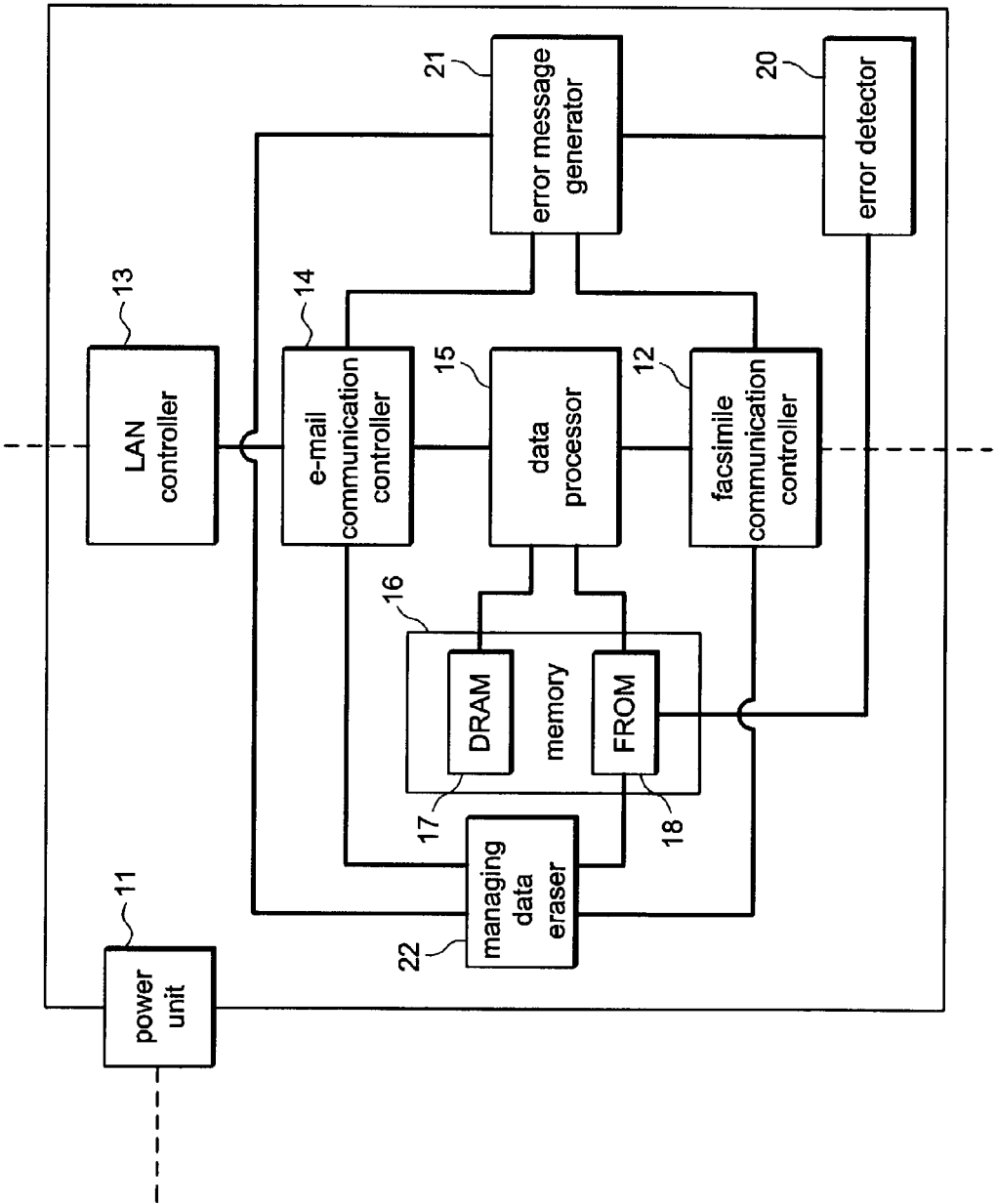
FIG. 2 is a block diagram illustrating a main configuration of the Internet communication control apparatus according to the present invention.

FIG. 2 is a block diagram illustrating a main configuration of Internet communication control apparatus 1. This communication control apparatus 1 includes power unit 11, facsimile communication controller 12 that is connected to facsimile apparatus 3 via an interface (not shown in FIG. 2), LAN controller 13 that is connected to LAN 4, e-mail communication controller 14 that exchanges e-mail with LAN 4, data processor 15 that is connected to facsimile communication controller 12 and e-mail communication controller 14 (later described), and memory 16 that stores data and is connected to data processor 15. Memory 16 includes large capacity DRAM 17 that operates only when the power is supplied from power unit, stores transmission contents, and is capable of high speed storing process, and FROM (flash memory) 18 that is configured with a non-volatile memory, which stores transmission managing data and cannot be erased even when the power fails. Moreover, the RAM that stores transmission contents is not limited to DRAM as long as it is capable of performing a data storing process faster than the FROM, therefore, other kinds of memories can be employed as the RAM.

Error detector 20 that detects an error is connected to FROM 18, while error message generator 21 is connected to error detector 20. Error message generator 21 is connected to facsimile communication controller 12 and e-mail communication controller 14. Error detector 20 searches for an error from managing data stored in FROM 18, the error being caused by factors such as a power outage during e-mail/facsimile communication. Error message generator 21 then generates an error message of facsimile/e-mail data in accordance with the sender, so that the error message is delivered to the sender. Furthermore, managing data eraser 22, which is connected to facsimile communication controller 12 and e-mail communication controller 14, is connected to FROM 18, so that unnecessary managing data is erased in FROM 18.

The list of managing data includes "mode" that indicates whether the transmission comes from facsimile apparatus 2 (facsimile data) or other communication terminals (e-mail data), "destination" that includes telephone numbers and e-mail addresses, "sender" that includes telephone numbers and IP addresses, and "subject" that includes headlines.

Data processor 15 temporarily stores facsimile data in DRAM 17, the data being received from facsimile apparatus 2 via facsimile communication controller 12, converts the data into e-mail data, and transmits the same as e-mail to other communication terminals from e-mail communication controller 14 and LAN controller 13 via LAN 4 and Internet 5. Conversely, data processor 15 also analyzes e-mail data from LAN 4, converts the same into facsimile data, temporarily stores the same in DRAM 17, and transmits the facsimile data to facsimile apparatus 2 via facsimile communication controller 12.

Figure 3:
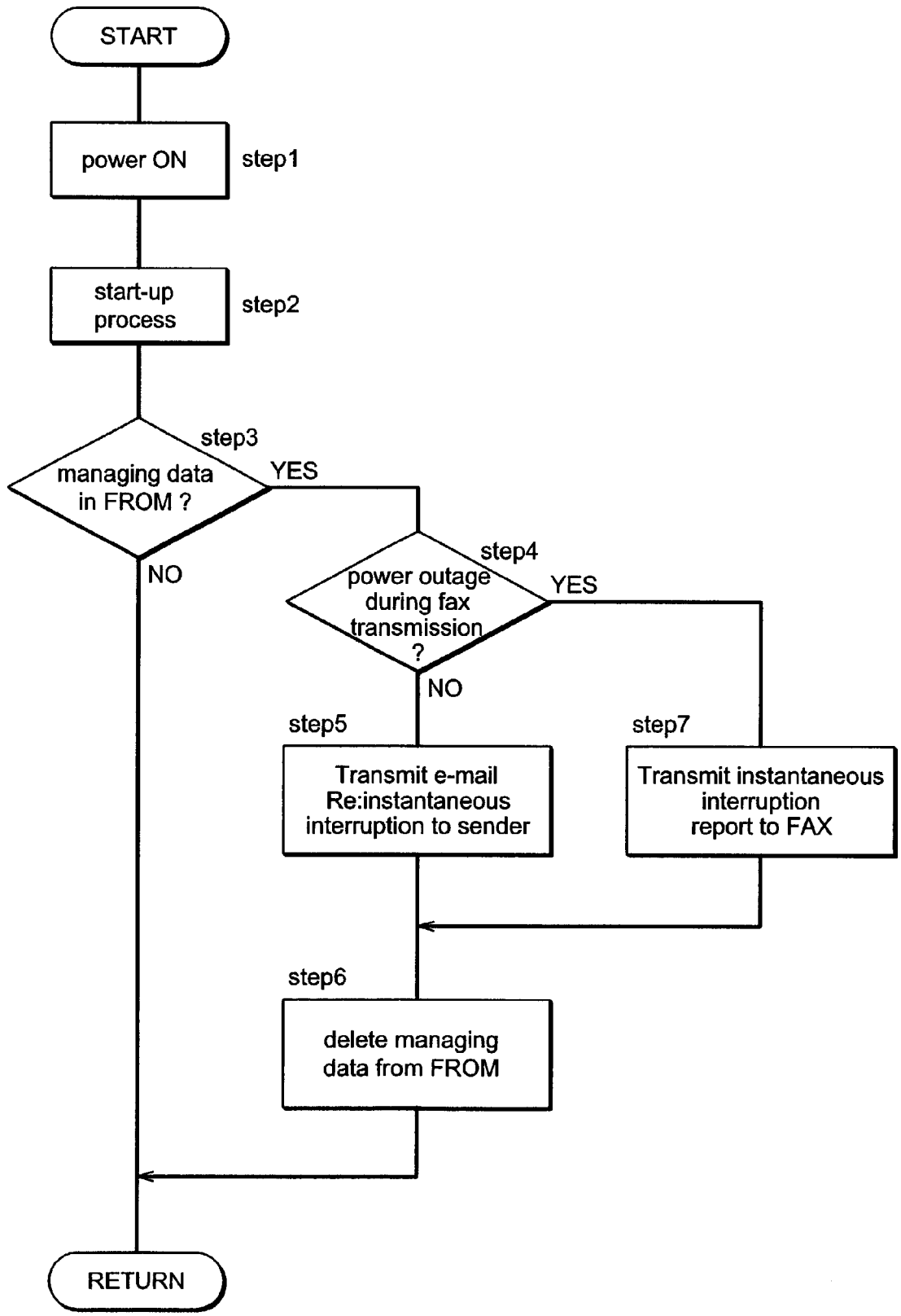
FIG. 3 is a flowchart illustrating an operational process of the Internet communication control apparatus according to the present invention.
Figure 4:
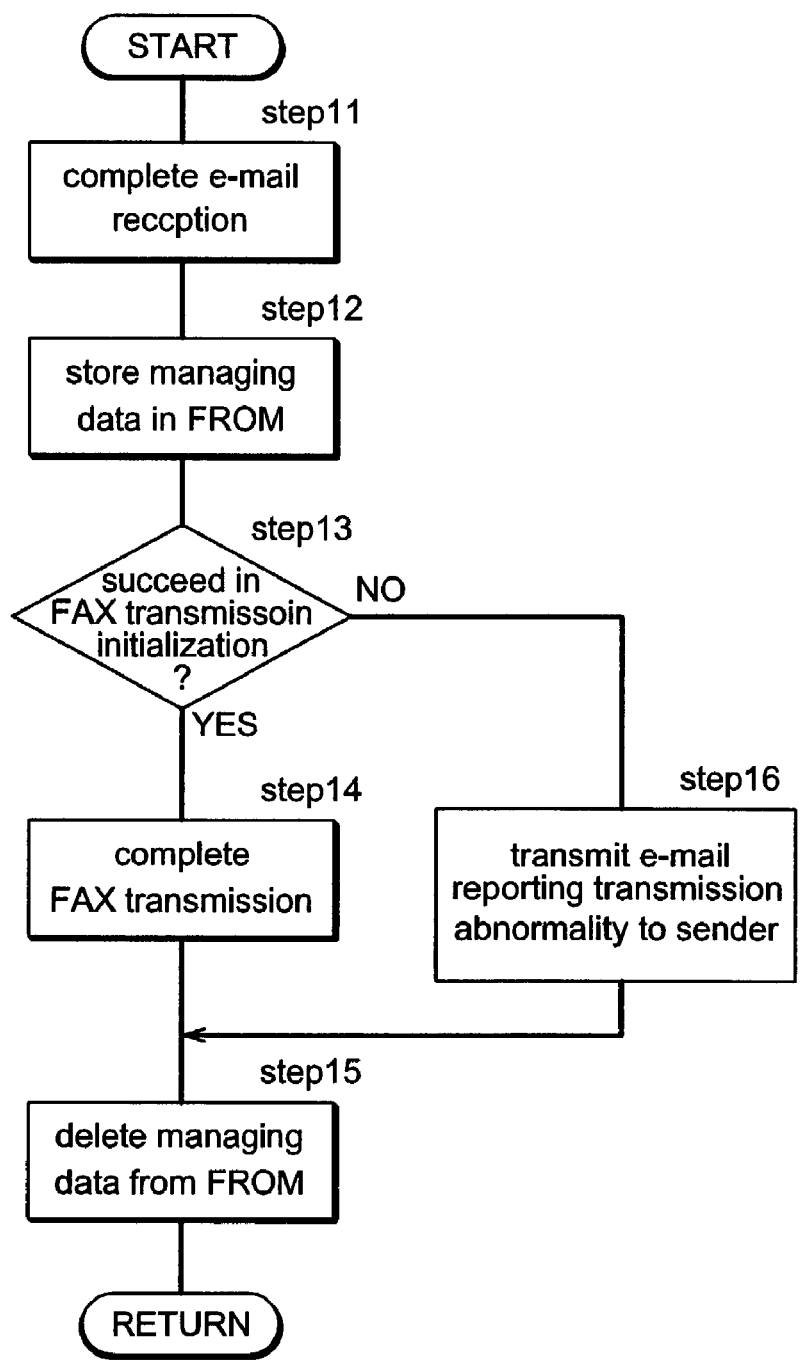
FIG. 4 is a flowchart illustrating an operational process of the Internet communication control apparatus according to the present invention.
Figure 5:
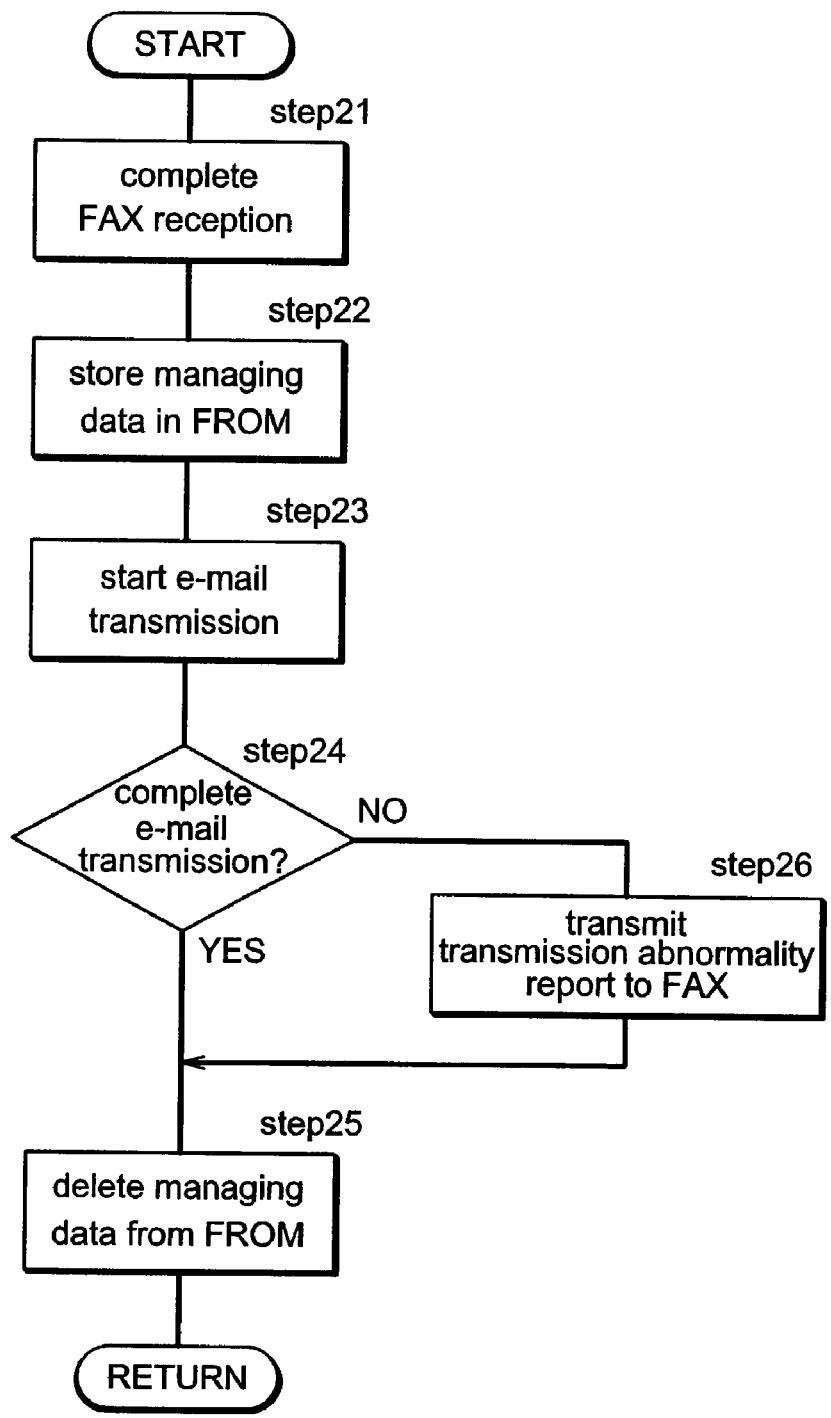
FIG. 5 is a flowchart illustrating an operational process of the Internet communication control apparatus according to the present invention.

FIGS. 3-5 illustrates a main operational process of Internet communication control apparatus 1. As shown in FIG. 3, when Internet communication control apparatus 1 is turned on at Step 1, a start-up process is performed at Step 2, and error detector 20 determines whether there is managing data that is not erased in FROM 18, i.e., whether there is a communication process that has not completed a data exchange at Step 3. When there is no such data, the control proceeds to a normal process that is not shown in the figures.

When un-erased managing data is found, it is determined whether the error is caused by a power outage during a transmission from facsimile apparatus 2 or during a transmission from another communication terminal to facsimile apparatus 2 at Step 4. When the error is not cause by a power outage during a transmission from facsimile apparatus 2, i.e., when the error is caused by a power outage during a transmission from another communication terminal to facsimile apparatus 2, the control proceeds to Step 5, to generate an e-mail data error message using error message generator 21 and to transmit e-mail regarding the instantaneous interruption to the sender communication terminal via LAN 4 and Internet 5, from e-mail communication controller 14 and LAN controller 13. At Step 6, error message generator 21 via managing data eraser 22 erases managing data that is stored in FROM 18, to proceed to a normal process that is not shown in the figures.

When it is determined that the error is caused by a power outage during a transmission from facsimile apparatus 2 at Step 4, the control proceeds to Step 7 wherein error message generator 21 generates a facsimile data error message, which is transmitted as an instantaneous interruption report to facsimile apparatus 2 via facsimile communication controller 12. Then, the control proceeds to Step 6.

As shown in FIG. 4, when e-mail data is received from another communication terminal during a normal procedure, upon completing a reception at Step 11, managing data is stored in FROM 18 at Step 12. Then, the e-mail data is converted into facsimile data and temporarily stored in DRAM 17. Next, the facsimile transmission to facsimile apparatus 2 starts. During this time, the facsimile transmission initialization is confirmed at Step 13. When the facsimile transmission initialization is successful, the control waits until the facsimile transmission is completed at Step 14. Then, managing data stored in FROM 18 is erased via managing data eraser 22 at Step 15, which completes the process.

When the facsimile transmission initialization cannot be confirmed due to errors such as the power being out at facsimile apparatus 2 and telephone line being disconnected, i.e., when the facsimile transmission initialization is unsuccessful, error message generator 21 generates an e-mail data error message so that the transmission error information is transmitted as e-mail to the sender communication terminal, from e-mail communication controller 14 and LAN controller 13 via LAN 4 and Internet 5. At Step 15, the managing data that is stored in FROM 18 is erased via managing data eraser 22, which completes the process.

As shown in FIG. 5, when facsimile data is received from facsimile apparatus 2, the facsimile data is temporarily stored in DRAM 17 upon completing the reception at Step 21, and the managing data is stored in FROM 18 at Step 22. Next, the facsimile data is converted into e-mail data in data processor 15, and the e-mail transmission starts at Step 23. Here, a telephone number is input as a destination instead of an e-mail address. Thus, an e-mail address is obtained either by referring to a corresponding table within communication control apparatus 1 (no shown) that associates telephone numbers with e-mail addresses, or by accessing gatekeeper 8, in order to perform an e-mail transmission. When the completion of e-mail transmission is confirmed at Step 24, the managing data stored in FROM 18 is erased via managing data eraser 22 at Step 25, which completes the process.

In addition, when the completion of the e-mail transmission cannot be confirmed at Step 24, because of errors such as the mail server being down, a signal line being disconnected, i.e., when the e-mail transmission is unsuccessful, error message generator 21 generates a facsimile data error message, so that the transmission error report is transmitted as facsimile data to sender facsimile apparatus 2 via facsimile communication controller 12. Then, at Step 25, the managing data that is stored in FROM 18 is erased via managing data eraser 22, which completes the process.

Accordingly, when either facsimile communication or e-mail communication is complete, managing data is erased in FROM 18. When the communication fails, the sender is first notified of the error, and the managing data is erased in FROM 18. Therefore, when managing data is found in FROM 18, it indicates that the communication has failed and the sender has not been notified of the error. This further implies that the power is out at Internet communication control apparatus 1. Therefore, by detecting the problem when the power comes back, it is possible to notify the sender of any errors.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

This application is based on the Japanese Patent Application No. 2001-355905 filed on Nov. 21, 2001, entire content of which is expressly incorporated by reference herein.

What is claimed is:

1. A network communication control apparatus that is connected to both a facsimile apparatus and a terminal on a network, the network communication control apparatus comprising:
a first transmitter that converts first facsimile data from the facsimile apparatus into first e-mail data, and transmits the first e-mail data to the terminal via the network;
a second transmitter that converts second e-mail data from the terminal into second facsimile data, and transmits the second facsimile data to the facsimile apparatus;
a memory configured to store management data, when the network communication receives the first e-mail data from the facsimile apparatus or the second facsimile data from the terminal;
a detector that determines, at a predetermined time, whether the transmission of the first e-mail data is not complete and whether the transmission of the second facsimile data is not complete, in accordance with management data stored in said memory; and
a controller that notifies the facsimile apparatus that the transmission of the first e-mail data is not complete, when said detector determines that the transmission of the first e-mail data is not complete, and notifies the terminal that transmission of the second facsimile data is not complete, when said detector determines that the transmission of the second facsimile data is not complete.

2. The network communication control apparatus of claim 1, wherein the predetermined time is when the power to the communication control apparatus is turned on.

3. The network communication control apparatus of claim 1, wherein, when a transmission from the facsimile apparatus to the terminal is not complete, said controller generates a message indicating the error and transmits the message as a facsimile message to the facsimile apparatus.

4. The network communication control apparatus of claim 1, wherein, when a transmission from the terminal to the facsimile apparatus is not complete, said controller generates a message indicating the error and transmits the message as an e-mail message to the terminal.

5. The network communication control apparatus of claim 1, wherein said memory includes a non-volatile memory.

6. The network communication control apparatus of claim 5, wherein said memory includes a RAM configured to store data with a high speed and a flash memory that is used as the non-volatile memory, the flash memory storing the management data that includes whether a transmission from the facsimile apparatus to the terminal is complete and/or whether a transmission from the terminal to the facsimile apparatus is complete, the RAM storing transmission data from the facsimile apparatus to the terminal and/or transmission data from the terminal to the facsimile apparatus.

7. The network communication control apparatus of claim 1, the management data being erased from said memory in response to completion of transmission of the first e-mail data or completion of transmission of the second facsimile data, or upon notifying the facsimile apparatus or the terminal that the transmission of the first e-mail data or the second facsimile data is incomplete, and wherein the detector determines whether transmission of the first e-mail data or of the second facsimile data is complete based upon the presence of the management data when the power to the network communication control apparatus is turned on, in order to determine whether there is un-transmitted data due to a power failure at the network communication control apparatus.

8. The network communication control apparatus of claim 1, wherein the memory stores a sender's e-mail address when the transmission from the terminal to the facsimile apparatus is not complete, and the controller notifies the terminal by transmitting an e-mail message to the sender's e-mail address.

* * * * *